Sept. 11, 1951        J. V. HUPCEY        2,567,210
ULTRA HIGH FREQUENCY ATTENUATOR
Filed July 23, 1947
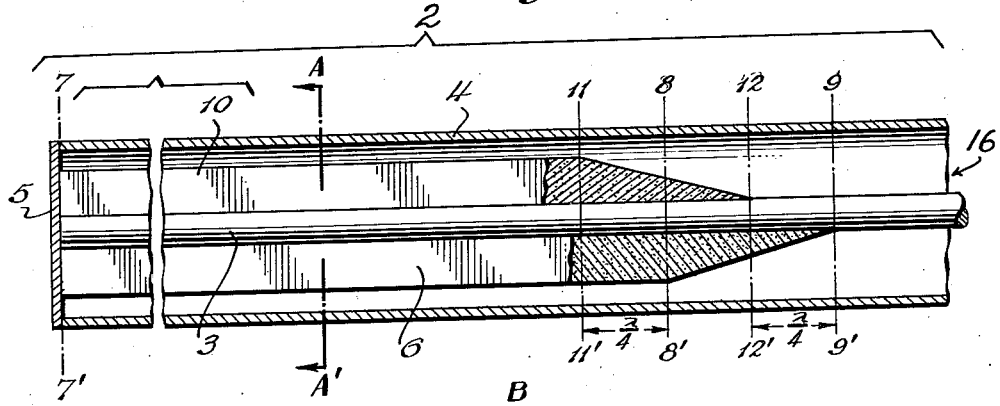
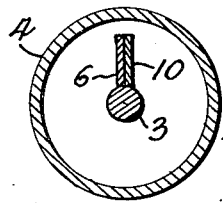
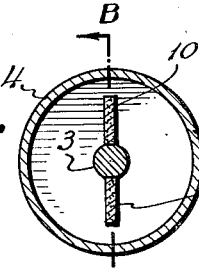
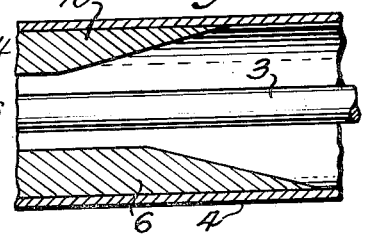
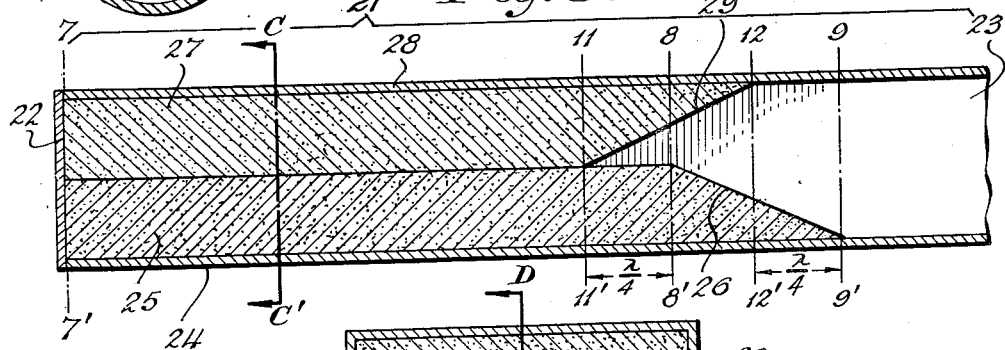
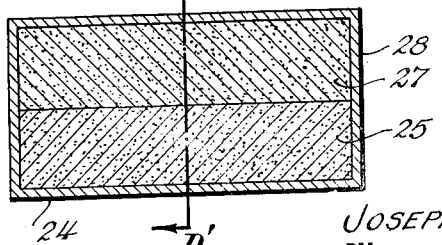
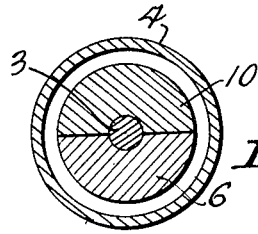
INVENTOR.
JOSEPH V. HUPCEY
BY
Paul B. Hunter
ATTORNEY Patented Sept. 11, 1951

2,567,210

UNITED STATES PATENT OFFICE 2,567,210

ULTRA-HIGH-FREQUENCY ATTENUATOR

Joseph V. Hupcey, Hempstead, N. Y., assignor to The Sperry Corporation, a corporation of Delaware Application July 23, 1947, Serial No. 762,967

16 Claims. (Cl. 178—44)

This invention relates to ultra-high-frequency energy attenuating apparatus and particularly relates to ultra-high-frequency energy-absorbing terminations for transmission lines, such as coaxial lines and wave guides.

It has been known that a termination for low-power energy absorption may be made by inserting a longitudinal strip of dissipative material into a section of the transmission line. In order to minimize reflections over a band of frequencies, the portion of the strip closest to the source of the ultra-high-frequency energy is axially tapered. Where a termination of greater power absorption is desired a thicker dissipative strip or two coextensive thin dissipative strips are inserted into the transmission line. In both such types of apparatus, as in the lower-power terminations, the dissipative strips have tapered ends. However, in order to minimize energy reflections over the desired band of frequencies, the tapers must be more gradual and must extend for a much greater axial distance than the taper of the low-power termination, resulting in terminations that, for many applications, are too long.

Accordingly it is an object of this invention to provide a comparatively short, yet substantially reflectionless, transmission line termination useful over a wide band of frequencies.

It is a further object of the invention to provide novel transmission line apparatus for attenuation of ultra-high-frequency energy.

In accordance with one aspect of the invention, these objects are attained by providing a section of transmission line, that is open circuited at one end for coupling a source of energy to the transmission line and is short-circuited at the other end. Within the transmission line section are positioned two axially extending strips or blocks of dissipative material similarly tapered at the ends facing the open end of the line section. The strips are so positioned with respect to each other that corresponding points of their tapered end portions are spaced apart one-quarter wavelength at some frequency (usually the center frequency), within the desired frequency-band of the termination. With the tapered end portions so staggered, the termination causes only a minimum of energy-reflection without the necessity of excessively long tapered end portions, and is satisfactorily short for many applications.

The invention also relates to the novel features or principles of the instrumentalities described herein, whether or not such are used for the stated objects, or in the stated fields or combinations.

In the drawings,

Fig. 1 is a longitudinal sectional view of one form of the invention in the form of a coaxial line termination, viewed along line B—B' of Fig. 2;

Fig. 2 is a cross-sectional view of the device of Fig. 1, viewed along line A—A' thereof;

Figs. 2A, 2B and 2C are cross-sectional views of modifications of the device shown in Fig. 1;

Fig. 3 is a longitudinal sectional view of another form of the invention as applied to a waveguide, and viewed along line D—D' of Fig. 4;

Fig. 4 is a cross-sectional view of the device of Fig. 3 viewed along line C—C' thereof.

Referring to Figs. 1 and 2, there is shown a coaxial line termination comprising a section of coaxial line 2 having an inner conductor 3 and an outer conductor 4. The coaxial line section 2 is short-circuited at its left end 5 and open-circuited at its right end 16. If desired, any of the conventional coaxial line coupling fittings may be affixed to the open end 16 for coupling the termination to another coaxial line section or a source of ultra-high-frequency energy.

Cemented to the lower part of the inner conductor 3, and extending axially along it, is a block or strip 6 of any suitable dissipative material, such as "Polyiron." Preferably the inner conductor 3 is flattened over the portion to which block 6 is to be cemented. Block 6 then has a flat surface cemented to this flat portion of the inner conductor. The block 6 extends rightward from a transverse plane 7—7' adjacent the short-circuited end 5 and has constant transverse dimensions from the transverse plane 7—7' to the transverse plane 8—8' and then tapers inwardly toward the inner conductor 3 terminating at the transverse plane 9—9'. As shown, the constant-dimension portion of block 6 extends only partially between conductors 3 and 4.

Also cemented to the inner conductor 3 and diametrically opposite the lower block 6 is an upper block 10 of similar dissipative material. Block 10 also extends rightward from the transverse plane 7—7' and has constant transverse dimensions only to the transverse plane 11—11', which is spaced leftward from the transverse plane 8—8' one-quarter wavelength of the center frequency of the frequency band of operation of the termination of Figs. 1 and 2. From the transverse plane 11—11', the upper block 10 tapers toward the inner conductor in manner similar to the tapering of the lower block 6 and terminates at the transverse plane 12—12', which is one-quarter wavelength to the left of the terminating plane 9—9' of the lower block 6. As shown in Fig. 1, the tapered portions of both blocks are identical, but are so positioned with respect to each other that corresponding points of the two tapered portions are spaced substantially one-quarter wavelength at the center frequency of the band.

In one form actually constructed, the termination was designed as a termination for a ⅝" rigid coaxial line and for a frequency band of 4000–6000 mc. The outer conductor of the termination had an inner diameter of .562 inch and the inner conductor had an outer diameter of .250 inch. The material of the dissipative blocks was "Polyiron." The lower block was 3.750 inches long and .125 inch thick. The tapered section was 1.750 inches long and tapered in that distance from a transverse dimension of substantially zero to a maximum transverse dimension of .137 inch, .137 inch also being the transverse dimension of the remaining 2.000 inches of the block.

The upper block had an axial length of 3.160 inches and was .125 inch thick. The tapered portion was identical to the tapered portion of the upper block and the remainder of the upper block also had a transverse dimension of the .137 inch but had an axial length of only 1.410. The blocks were so positioned with respect to each other that the corresponding points of the tapered portions were axially spaced .590 inch.

The reflections caused by the termination were satisfactorily low over the frequency range of 4000–6000 mc. The VSWR caused by the termination was 1.05 or lower for the various frequencies within the frequency range for which the termination was designed.

Although the axial spacing of the tapered portions of the block has been described as being one-quarter wavelength, it is not intended that the invention be restricted to that spacing. It may be three-quarter or any other odd integral multiples of one-quarter wavelength. Also, the quarter-wavelength spacing need not be that exactly of the center frequency of the design band, but may be at other frequencies in the neighborhood of the center frequency.

Although the dissipative blocks 6 and 10 were shown in Figs. 1 and 2 as being positioned diametrically opposite each other, other arrangements and configurations are possible and are contemplated by this invention. In traveling leftward from the transverse plane 9—9' to the transverse plane 12—12', the total amount of dissipative material per unit length of line increases in accordance with the taper of the lower block 6 alone. From the transverse plane 12—12' to the transverse plane 8—8', the total amount of dissipative material per unit length of line increases in accordance with the sum of the tapers of both the upper and lower blocks 10 and 6 and is the sum of the individual amounts of the dissipative material of each block in the particular unit length of line. From the transverse plane 8—8' to the transverse plane 11—11', the total amount of dissipative material per unit of length of line increases in accordance with the taper of the upper block 10 alone and is the sum of the individual amounts of dissipative material of each block in the particular unit length of line. From the transverse plane 11—11' to the transverse plane 7—7', there is no variation in the total amount per unit length.

It can be seen that these variations in the total amount of material present within a unit length of line can be produced by configurations and arrangements of dissipative blocks other than those shown in Figs. 1 and 2. Thus, the dissipative blocks may be positioned alongside of each other as shown in Fig. 2A, instead of diametrically opposite. When such positioning is desired the two blocks may be combined in a single structure. Also, the two blocks may be combined in a unitary structure of constant thickness whose variation in radial dimension along the coaxial line varies with the sum of the individual varying radial dimensions of each of the blocks shown in Figs. 1 and 2.

Another modification, useful for high-power termination, would use a pair of blocks of semicircular cross-section, with semi-conical tapered portions as shown in Fig. 2B, the two blocks being staggered as described above, so that for the major part of their extent, the inner conductor 3 is completely encircled by dissipative material.

Other variations are also contemplated by this invention such as the use of tapered portions which taper in accordance with a mathematical function other than the linear function of taper shown in Figs. 1 and 2. For example, an exponential function may be utilized as the basis of the taper.

Still another variation may be the use of dissimilarly-shaped tapered portions in place of the similarly-shaped tapered portions of the blocks shown in Figs. 1 and 2. For example, the rate of change of the taper of the upper block 10 may be made greater than that of the taper of the lower block 6 inasmuch as some of the energy will have been attenuated by the lower block by the time the energy reaches the upper block 10 and it may be advantageous to have the tapered portion of the upper block 10 reflect a greater percentage of the incident energy than that reflected by the lower block 6 in order that the absolute value of the energy reflected by each be the same.

It will be understood that the dissipative blocks 6, 10 may be cemented to the outer conductor as shown in Fig. 2C, if desired, in which case the taper preferably runs inwardly.

Although the invention has been described above as applied to a termination for a coaxial line, the invention is also applicable to other forms of transmission lines. Referring to Figs. 3 and 4, there is shown an embodiment of the invention as applied to a rectangular waveguide 21. The section 21 of a waveguide is short-circuited at its left end 22 and open-circuited at its right end 23. As in Figs. 1 and 2, a conventional coupling or fitting may be fixed to the open end 23 for coupling other sections of waveguide to the waveguide termination. Positioned on the lower wide wall 24 of the waveguide section 21 and within the waveguide section 21 is a block 25 of dissipative materials, whose wide dimension is shown as equal to that of the wide wall 24. The lower dissipative block 25 extends rightward from the end 22 to a transverse plane 8—8', completely filling the lower half of the wave guide section 21 between the end 22 and the transverse plane 8—8'. From the transverse plane 8—8' the upper surface of the dissipative block 25 tapers downward until it meets the lower wide wall 24 at the transverse plane 9—9'.

Positioned within the wave guide section 21 and above the lower dissipative block 25 is another block 27 of dissipative material, whose wide dimension is also equal to that of the wide wall 24 of the wave guide section. The upper dissipative block 27 extends rightward from the left end 22 to the transverse plane 11—11', which is one-quarter wavelength to the left of the transverse plane 8—8'. The upper dissipative block 27 completely fills the upper half of the wave guide section 21 between the left end 22 and the transverse plane 11—11'. From the transverse plane 11—11', the upper dissipative block 27 extends rightward and its lower surface tapers upward until it meets the upper wide wall 28 of the wave guide section 21 at the transverse plane 12—12', which is one-quarter wavelenth to the left of the transverse plane 9—9'.

Although this form of the invention has been described as using blocks 25, 27 which fill an entire half of the wave guide, it will be understood that for less dissipation the blocks 25, 27 need only partially fill the guide; in such case, they are preferably located along the guide center line, although other locations are also useful. If desired, smaller blocks could also be placed side by side along one wide wall of the guide, while retaining the desired staggered relation. In such case, the blocks are not limited in transverse width to one-half of the guide thickness, as in Fig. 4, but may extend up to the full guide thickness, according to amount of dissipation desired. If desired, each block may have a width equal to one-half the guide width, and with a thickness tapering from the full guide thickness to zero, the blocks being then side by side and staggered according to the invention.

It will be understood that the two blocks of any of the modifications of the invention are preferably, although not necessarily, of the same transverse dimensions for their untapered parts. The tapers may or may not be of the same length or gradation. A single partially tapered block, having changes in taper at a quarter wavelength from its zero dimension and a further change in taper at the same distance from its maximum dimension point (corresponding to plane 11—11') may also be used in place of two blocks.

Wherever dimensions are mentioned herein in terms of wavelength, it is understood that the physical dimensions are those which give the same effect within the line as the particular fractions of wavelength would give in free space, allowance being made for the dielectric material or mode of propagation within the line. Where a quarter-wavelength is mentioned herein, any odd integral multiple thereof may be substituted.

In place of only two blocks, such as shown above a greater plurality may be used. In one arrangement, an even plurality is used, with blocks of each pair separated by a quarter-wavelength as discussed above, the spacing of the various pairs being immaterial. In another arrangement, the spacing between successive blocks is a quarter-wavelength.

While the above invention has been illustrated as a termination, it will be apparent that it is equally useful as an attenuator, by removing the short-circuit at one end of the line section. If desired, staggered tapers according to the invention can be used at both ends of such an attenuator.

Thus, by the invention as described above, there has been provided, for a transmission line, a novel energy-dissipative termination that is comparatively short and yet capable of dissipating larger amounts of power while producing only a minimum of energy reflections. This termination provides a broader useful frequency band for a given length, or a shorter termination for a given frequency band, than prior known devices of this type.

Wherever the term "transmission line" is used herein, it will be understood as applying to both two-conductor lines (such as coaxial lines) and one-conductor lines, such as wave guides or wave ducts.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. Ultra-high-frequency apparatus for dissipating ultra-high-frequency energy comprising a section of transmission line; and axially extending dissipative material increasing in mass from a minimum cross-sectional area to a maximum cross-sectional area in three successive stages within said transmission line, said dissipative material including a first portion axially increasing in mass in accordance with a given function and extending for an odd integral number of quarter-wavelengths of said ultra-high-frequency energy, a second portion contiguous to said first portion and axially increasing in mass in accordance with a function different from that of said first portion, and a third portion contiguous to said second portion and having an axial extent of an odd number of quarter-wavelengths of said high frequency energy, said third portion axially increasing in mass in accordance with a function different from that of said second portion.

2. Apparatus for attenuating ultra-high-frequency energy comprising a section of transmission line, a first dissipative body within said transmission line and having a tapered portion of dissipative material axially increasing in mass with distance from the source of said high-frequency energy and a second dissipative body within said transmission line and also having a tapered portion of dissipative material axially increasing in mass with distance from the source of said high-frequency energy, said two tapered portions being partially coextensive along the axis of said transmission line and corresponding points of the said two tapered portions being axially spaced substantially an odd number of quarter-wavelengths of the ultra-high-frequency energy.

3. A transmission line ultra-high-frequency energy termination comprising a section of transmission line short-circuited at one end and open-circuited at the other end; a first dissipative body within said section of transmission line and extending axially therealong, the end portion of said first dissipative body adjacent the open-circuited end of said section of transmission line having a transverse dimension increasing with axial distance from said open-circuited end; and a second dissipative body within said transmission line and extending axially therealong, the end portion of said second dissipative body adjacent the open-circuited end of said transmission line section having a varying transverse dimension similar to the said end portion of said first dissipative body, corresponding points of said two end portions being axially spaced an odd number of quarter wavelengths of the ultra-high-frequency energy.

4. Apparatus for attenuating energy within a given band of frequencies comprising a section of transmission line; a first dissipative body within said transmission line and extending axially therealong, said first dissipative body including a first portion of dissipative material of unvarying dimension over a first axial extent of said section of transmission line and also including a second portion of dissipative material connected to said first portion and having a varying transverse dimension over a second axial extent of said transmission line section; and a second dissipative body within said transmission line and extending axially therealong, said second dissipative body including a first portion of dissipative material of unvarying dimension over an axial extent of said transmission line section at least partially coextensive with said first portion of said first dissipative body and also including a second portion of dissipative material connected to said first portion and having a varying transverse dimension only partially coextensive with the varying dimension of said second portion of said first dissipative body.

5. Apparatus as in claim 4 in which the varying dimension portions of the said two dissipative bodies have the same axial length.

6. Apparatus as in claim 5 in which corresponding points of the varying-dimension portions of the said dissipative bodies are spaced an odd number of quarter wavelengths of a frequency within said given band of frequencies.

7. Apparatus for attenuating energy within a given band of frequencies comprising a section of transmission line short-circuited at one end and open-circuited at the other end; a first dissipative body extending axially from said short-circuited end toward said open-circuited end and having fixed transverse dimensions for a first axial extent of said first dissipative body and having a transverse dimension smoothly varying to substantially zero for a second axial extent of said first dissipative body, and a second dissipative body also extending axially from said short-circuited end toward said open circuited end for a distance only partially coextensive with said first dissipative body and having constant transverse dimensions over a first axial extent of said second dissipative body and a transverse dimension varying smoothly to substantially zero over a second axial extent of said second dissipative body.

8. Apparatus as in claim 7 in which the said second axial extent of said first dissipative body is equal to the said second axial extent of said second dissipative body.

9. Apparatus as in claim 8 in which the corresponding points of the said second axial extents of the said dissipative bodies are spaced an odd number of quarter wavelengths at a frequency within the given band of frequencies.

10. Ultra-high-frequency apparatus for minimum energy reflection of energy within a given band of frequencies, comprising a section of transmission line having a given characteristic impedance when containing only air; a first axially extending body within said transmission line section and adapted to change the characteristic impedance of said transmission line section, said first body having a varying dimension over a predetermined axial extent of said first body; and a second axially extending body within said transmission line section and also adapted to change the characteristic impedance of said transmission line section, said second body having a varying dimension over a predetermined axial extent of said second body equal to and partially coextensive with said first axial extent of said first body, the corresponding points of said predetermined axial extents of said bodies being spaced an odd number of quarter-wavelengths at a frequency within the given band of frequencies.

11. Ultra-high-frequency terminating apparatus for a transmission line having a closed outer boundary, comprising a pair of tapered dissipative bodies within said boundary and having staggered axial positions, said tapered bodies being partially coextensive along the axis of said transmission line.

12. Apparatus as in claim 11 wherein said bodies have their input edges separated by substantially one-quarter wavelength at a frequency in the operating range of said apparatus.

13. Ultra-high-frequency apparatus comprising a transmission line section having a closed outer boundary and dissipative material within said boundary, said material having a cross-sectional area tapering from zero to maximum in three successive stages of which the center stage has a different degree of taper from the outer stages.

14. Apparatus as in claim 13 wherein each of said outer stages has a length substantially equal to an odd integral multiple of a quarter-wavelength at a frequency within the operating range of said apparatus.

15. Apparatus as in claim 14 wherein said outer stages have equal degree of taper.

16. Ultra-high-frequency apparatus comprising a section of transmission line having an enclosed outer boundary, and a pair of elongated dissipative bodies within said boundary, each of said bodies having a tapered portion and a uniform portion, said tapered portions being axially displaced along said line section and being partially coextensive along the axis of said transmission line.

JOSEPH V. HUPCEY.

REFERENCES CITED

The following references are of record in the file of this patent:

UNITED STATES PATENTS

| Number | Name | Date |
|---|---|---|
| 2,129,714 | Southworth | Sept. 13, 1938 |
| 2,207,845 | Wolf | July 16, 1940 |
| 2,210,636 | Schelkunoff | Aug. 6, 1940 |
| 2,232,179 | King | Feb. 18, 1941 |
| 2,409,599 | Tiley | Oct. 15, 1946 |
| 2,423,396 | Linder | July 1, 1947 |
| 2,430,130 | Linder | Nov. 4, 1947 |
| 2,433,368 | Johnson | Dec. 30, 1947 |
| 2,482,173 | Hagstrum | Sept. 20, 1949 |

FOREIGN PATENTS

| Number | Country | Date |
|---|---|---|
| 583,501 | Great Britain | Dec. 19, 1946 |

OTHER REFERENCES

Gaffney Proceedings of the I. R. E., October 1946, pages 783, 791.